(12) United States Patent
Liu et al.

(10) Patent No.: US 8,110,527 B2
(45) Date of Patent: Feb. 7, 2012

(54) ALUMINA HAVING A COMPLEX PORE STRUCTURE, AND CATALYST AND PROCESS FOR SELECTIVE HYDROGENATION OF CRACKING GASOLINE

(75) Inventors: Zhongneng Liu, Shanghai (CN); Zaiku Xie, Shanghai (CN); Xinghua Jiang, Shanghai (CN); Xiaoling Wu, Shanghai (CN); Minbo Hou, Shanghai (CN); Hongyuan Zong, Shanghai (CN)

(73) Assignees: China Petroleum & Chemical Corporation, Beijing (CN); Shanghai Research Institute of Petrochemical Technology Sinopec, Shanghai (CN)

( * ) Notice: Subject to any disclaimer, the term of this patent is extended or adjusted under 35 U.S.C. 154(b) by 442 days.

(21) Appl. No.: 12/377,157

(22) PCT Filed: Aug. 2, 2007

(86) PCT No.: PCT/CN2007/002321
§ 371 (c)(1),
(2), (4) Date: Mar. 9, 2009

(87) PCT Pub. No.: WO2008/019581
PCT Pub. Date: Feb. 21, 2008

(65) Prior Publication Data
US 2010/0176030 A1    Jul. 15, 2010

(30) Foreign Application Priority Data

Aug. 11, 2006 (CN) .......... 2006 1 0029961
Aug. 11, 2006 (CN) .......... 2006 1 0029963
Nov. 2, 2006 (CN) .......... 2006 1 0117857

(51) Int. Cl.
*B01J 23/00* (2006.01)

(52) U.S. Cl. .......... 502/439; 502/339; 423/628
(58) Field of Classification Search .......... 423/628; 502/439, 339; 208/57, 143
See application file for complete search history.

(56) References Cited

U.S. PATENT DOCUMENTS

| 4,154,812 | A | * | 5/1979 | Sanchez et al. | 423/626 |
| 4,608,360 | A | * | 8/1986 | Abrevaya et al. | 502/226 |
| 6,703,343 | B2 | | 3/2004 | Park | |

FOREIGN PATENT DOCUMENTS

| CN | 1181165 A | 5/1998 |
| CN | 1184289 A | 6/1998 |
| CN | 1249208 A | 4/2000 |
| CN | 1289825 A | 4/2001 |
| CN | 1600430 A | 3/2005 |
| CN | 1635054 A | 7/2005 |
| CN | 1647857 A | 8/2005 |
| CN | 1689703 A | 11/2005 |
| CN | 1714937 A | 1/2006 |
| JP | 11-246868 | 9/1999 |

* cited by examiner

*Primary Examiner* — Steven Bos
(74) *Attorney, Agent, or Firm* — Scully, Scott, Murphy & Presser, P.C.

(57) ABSTRACT

The present invention discloses an alumina support having multiple pore structure, wherein the alumina support has a specific surface area of from 40 to 160 m$^2$/g and a total pore volume of from 0.3 to 1.2 cm$^3$/g; a pore volume of pores having a pore diameter of less than 30 nm comprises 5 to 60% of the total pore volume; a pore volume of pores having a pore diameter of from 30 to 60 nm comprises 20 to 75% of the total pore volume; and a pore volume of pores having a pore diameter of larger than 60 nm comprises 20 to 60% of the total pore volume. The present invention further discloses a catalyst used for selective hydrogenation of a pyrolysis gasoline, comprising: (a) the alumina support according to the invention; and (b) 0.01 to 1.2 wt. % of metal palladium or palladium oxides, based on the weight of the alumina support.

21 Claims, No Drawings

ALUMINA HAVING A COMPLEX PORE STRUCTURE, AND CATALYST AND PROCESS FOR SELECTIVE HYDROGENATION OF CRACKING GASOLINE

CROSS REFERENCE OF RELATED APPLICATIONS

The present application claims the benefit of the Chinese Patent Applications No. 200610029961.0, filed on Aug. 11, 2006; 200610029963.x, filed on Aug. 11, 2006; and 200610117857.7, filed on Nov. 2, 2006, which are incorporated herein by reference in their entirety and for all purposes.

FIELD OF THE INVENTION

The present invention relates to an alumina support having multiple pore structure, and to a catalyst and a process used for selective hydrogenation of pyrolysis gasoline, in particular, to a catalyst used for selective hydrogenation of full boiling range pyrolysis gasoline consisting of $C_5$ hydrocarbons up to hydrocarbon having an end boiling point of 204° C. or middle distillates of pyrolysis gasoline, such as one consisting of $C_6$ to $C_8$ hydrocarbons.

BACKGROUND OF THE INVENTION

In the processing of hydrocarbons, alumina supports are widely used due to theirs having relatively large specific surface areas and good stabilities. A useful application is the use as supports of selective hydrogenation catalysts for pyrolysis gasoline.

Pyrolysis gasoline is a by-product of ethylene industry. When producing ethylene by steam cracking from liquid feed such as naphtha, gas oil, and the like, an output of pyrolysis gasoline may be about 60 wt. % or more of the throughput of ethylene. Pyrolysis gasoline is typically subjected at first to a first-stage hydrogenation to remove highly unsaturated olefins, such as diene and styrene, and then to a second-stage hydrogenation to remove monoolefin as well as impurities containing sulfur, nitrogen, oxygen, and the like. The hydrotreated pyrolysis gasoline is then mainly used for producing aromatic hydrocarbons. Catalysts currently used in industry for the selective hydrogenation of pyrolysis gasoline are mainly Pd-based catalysts or Ni-based catalysts. During a selective hydrogenation reaction of pyrolysis gasoline, in particular full boiling range pyrolysis gasoline, due to the presence of impurities and poisons, such as unsaturated components, gums (i.e., polymers resulted from the polymerization of unsaturated components, such as dienes and styrene), heavy components, free water, heavy metals, etc. in the feed to be treated while industrial plants lack generally effective pretreating means, the introduction of such a feed directly to a catalyst bed inside a reactor may result in: (1) the catalyst will easily coke; (2) activity of the catalyst is reduced or lost because the $Al_2O_3$ support of the catalyst itself is hydrophilic, and thus preferentially adsorbs and cumulates water so as to make the catalyst oleophobic so that the adsorption of hydrocarbon reactants on the catalyst is cumbered; (3) activity of the catalyst is reduced or lost because the heavy components, oligomer gums, and the like are adsorbed onto the surface of the catalyst so as to block adsorbing-diffusing-desorbing channels so that the adsorption of reactants onto the catalyst is cumbered; (4) activity of the catalyst is reduced or lost because of the binding of poisons, such as heavy metals, arsenic, etc., in the feed to active sites of the catalyst by strong coordination; (5) light components which are more easily hydrogenated will unduly react so as to cause loss in yield of aromatic hydrocarbons, alternatively, heavy components which are more difficulty hydrogenated will incompletely react so as to render product unqualified. These will result in that the quality of the operation of the catalyst is reduced and that the cycle length and service lifetime of the catalyst are shortened, so that the catalyst has to be activated and regenerated frequently. Catalysts having relatively large pore volumes and relatively large pore diameters may reduce the buildup of gums and free water on the catalysts, and thus are more tolerant to the gums and the free water in the feed and capable of delaying the deactivation of the catalysts, thereby prolonging the cycle length and service lifetime of the catalysts. A pore structure of a supported catalyst is determined by a support forming the catalyst, and the preparation of a support having a relatively large pore volume and a relatively large pore diameter while ensuring that the catalyst has good activity at lower temperature therefore is a key for the preparation of a selective hydrogenation catalyst for pyrolysis gasoline, in particular, a hydrogenation catalyst useful in the hydrogenation of a full boiling range pyrolysis gasoline having a higher gum content and a higher free water content.

The introduction of pore enlarging agent during the colloid formation or washing in the preparation of pseudoboehmite, alternatively, during the moulding of pseudoboehmite is a process commonly used in the prior art for preparing an alumina support having larger pore volume and larger pore diameter.

CN1714937A discloses a process for preparing a molded alumina support having a large pore volume, comprising mixing aluminum ammonium carbonate and a nitrogen-containing compound other than acids, moulding and calcining at 350 to 650° C. for 1 to 8 hours. The support obtained by this process has a specific surface area of 200 to 350 $m^2/g$, and a mean pore diameter of 25 to 35 nm.

CN1689703A discloses a process for preparing an alumina support with dual apertures, comprising mixing an alumina hydrate with a nitrogen-containing compound other than acids and a halide, moulding and calcining at 600 to 850° C. for 1 to 10 hours. The obtained support has such a pore distribution that a pore volume of pores having a pore diameter of 10 to 20 nm comprises 35 to 80% of the total pore volume, a pore volume of pores having a pore diameter of 500 to 1200 nm comprises 15 to 60% of the total pore volume, and sum of pore volumes of pores having a pore diameter of less than 10 nm, of pores having a pore diameter of from larger than 20 nm to less than 500 nm, and of pores having a pore diameter of larger than 1200 nm comprises 5 to 40% of the total pore volume. The obtained support has an acid amount of 0.05 to 0.2 mmol/g.

CN1647857A discloses a process for preparing a macroporous alumina support, comprising mixing a pseudoboehmite having a crystallinity of less than 70% and an organic pore enlarging agent, moulding the mixture and calcining the moldings at 600 to 1100° C. for 0.5 to 4 hours. The support obtained by this process has a pore volume of 0.9 to 1.3 $cm^3/g$, and pores having a pore diameter of larger than 100 nm comprises 7 to 25% of the total pore volume.

CN1600430A discloses a process for preparing a macroporous alumina support, comprising mixing an alumina hydrate with a pore enlarging agent, moulding and calcining at 600 to 850° C. for 1 to 10 hours. The obtained support has a probable pore diameter of 14 to 20 nm, a pore volume of 0.6 to 1.2 $cm^3/g$, a specific surface area of 150 to 200 $m^2/g$, and an acid amount of 0.05 to 0.2 mmol/g.

Thus it can be seen that, although some supports having relatively large pore volumes can be prepared by using a pore enlarging agent, such supports contain a considerable amount of micropores less than 10 nm in pore diameter, and the pore distribution is relatively broad. Furthermore, if the pore enlarging agent is used in a smaller amount, its effect might be inconspicuous, whereas if the pore enlarging agent is used in a larger amount, it might adversely impact properties of the support, such as mechanical strength.

Chinese Patent Application CN1635054A discloses a catalyst used for the selective hydrogenation of heavy distillations of pyrolysis gasoline as well as preparation and use thereof. The alumina support contains 1 to 3 wt. % of an alkaline earth metal or an oxide thereof disposed on its surface, and contains Pd and Mo, alternatively, Pd and W, as active components, wherein the content of Pd is in a range of from 0.24 to 0.35 wt. %, and weight ratio of Pd to Mo or Pd to W is in a range of from 1:0.5 to 1:2.5. It is said that the catalyst can be used in the hydrogenation of $C_5$ to $C_9$ distillations, in particular, $C_8$ to $C_9$ heavy distillations of pyrolysis gasoline, and exhibits a high activity at lower temperature, a high tolerance to As, S, O, or N impurity, a high tolerance to gums, and a stable activity. However, the patent application is silent about the tolerance of the catalyst to water.

Chinese Patent CN1184289C discloses a catalyst used for the selective hydrogenation of pyrolysis gasoline as well as preparation and use thereof. The catalyst comprises titania-alumina complex as a support and metal Pa as an active component supported on the complexed support, wherein the content of metal Pa is 0.25 to 0.35 wt. %, based on the total weight of the catalyst. It is said that the catalyst can be operated under high space velocity of feed and has good selectivity and stability. However, the patent is silent about the tolerance of the catalyst to water and gums.

Chinese Patent Application CN1181165A discloses a selective hydrogenation catalyst consisting of 0.15 to 0.5 wt. % of Pd, 0.1 to 3.0 wt. % of an oxide of an alkaline earth metal, and alumina support, wherein the alumina support has a specific surface area of 50 to 150 $m^2/g$ and a pore volume of 0.35 to 0.55 $cm^3/g$, and pores having a pore radius of 5.0 to 10.0 nm provide more than 70% of the total pore volume. It is said that the catalyst is suitable for not only a first-stage selective hydrogenation of pyrolysis gasoline but also a process of selectively hydrogenating highly unsaturated hydrocarbons in $C_3$ to $C_6$ distillate oil to monoolefins. However, the catalyst has a relatively high active temperature, and the patent application is also silent about the tolerance of the catalyst to water and gums.

There therefore remains a need for a selective hydrogenation catalyst which can be operated under a higher space velocity of a feed and has a higher activity at lower temperature, a good selectivity, and a good tolerance to water and gums, to prolong regeneration cycle length and service lifetime of the catalyst.

SUMMARY OF THE INVENTION

An object of the invention is to provide an alumina support having multiple pore structure, wherein the alumina support has a specific surface area of from 40 to 160 $m^2/g$ and a total pore volume of from 0.3 to 1.2 $cm^3/g$; a pore volume of pores having a pore diameter of less than 30 nm comprises 5 to 60% of the total pore volume; a pore volume of pores having a pore diameter of from 30 to 60 nm comprises 20 to 75% of the total pore volume; and a pore volume of pores having a pore diameter of larger than 60 nm comprises 20 to 60% of the total pore volume.

Another object of the invention is to provide a process for preparing the above alumina support having multiple pore structure.

Still another object of the invention is to provide a catalyst used for selective hydrogenation of a pyrolysis gasoline, comprising:
(a) the alumina support according to the invention; and
(b) 0.01 to 1.2 wt. % of metal palladium or palladium oxides, based on the weight of the alumina support.

Still another object of the invention is to provide a process for selectively hydrogenating a pyrolysis gasoline, comprising contacting the pyrolysis gasoline with the catalyst according to the invention under hydrogenation conditions.

DETAILED DESCRIPTION OF THE PREFERRED EMBODIMENTS

In the first aspect, the present invention provides an alumina support having multiple pore structure, wherein the alumina support has a specific surface area of from 40 to 160 $m^2/g$ and a total pore volume of from 0.3 to 1.2 $cm^3/g$; a pore volume of pores having a pore diameter of less than 30 nm comprises 5 to 60% of the total pore volume; a pore volume of pores having a pore diameter of from 30 to 60 nm comprises 20 to 75% of the total pore volume; and a pore volume of pores having a pore diameter of larger than 60 nm comprises 20 to 60% of the total pore volume. The alumina support has a multiple pore distribution and a larger probable pore diameter.

In a preferred embodiment, the alumina support having multiple pore structure has a specific surface area of from 50 to 150 $m^2/g$ and a total pore volume of from 0.4 to 1.0 $cm^3/g$; a pore volume of pores having a pore diameter of less than 30 nm comprises 5 to 55% of the total pore volume; a pore volume of pores having a pore diameter of from 30 to 60 nm comprises 20 to 72% of the total pore volume; and a pore volume of pores having a pore diameter of larger than 60 nm comprises 20 to 45% of the total pore volume. In a further preferred embodiment, a pore volume of pores having a pore diameter of less than 10 nm comprises 0 to 10% of the total pore volume.

In a preferred embodiment, the alumina support having multiple pore structure further comprises: (a) 0.1 to 1.5 wt. %, preferably 0.2 to 0.8 wt. % of at least one metal selected from the group consisting of alkali metals and alkaline earth metals and presented in a form of salt(s) and/or oxide(s) thereof and/or (b) 0.1 to 20.0 wt. %, preferably 0.2 to 10.0 wt. % of at least one element selected from the group consisting of elements of Group IVA and Group VA of the Periodic Table and presented in a form of compound(s) thereof, with all the percentages being based on the weight of the alumina support. The above component (a) is preferably at least one selected from the group consisting of K, Ca, Mg and Ba and presented in a form of salt(s) and/or oxide(s) thereof; and the above component (b) is preferably at least one selected from the group consisting of Si and P and presented in a form of compound(s), in particular, oxide(s) thereof.

Without being limited to a particular theory, it is believed that the above component (a) can adjust acidity of the support, neutralize strong acidic sites of the support, and improve the dispersion of active component, and that the above component (a) can alter phase inversion temperature of the alumina support so as to ensure that the alumina support still have a relatively large specific surface area after being calcined at a relatively high temperature. Without being limited to a particular theory, it is believed that the above component (b) can adjust hydrophobicity of the alumina support, alter acidity of the alumina support, and strengthen the interaction between the later supported metal and the support. It is believed that the combination of the above components (a) and (b) will aid to improve catalytic activity at lower temperature, selectivity, free water tolerance, impurities tolerance (such as heavy metal tolerance) of a catalyst prepared from the alumina support.

The alumina support having multiple pore structure is a composition comprising alumina A and alumina B, wherein the alumina A is derived from at least one alumina precursor selected from the group consisting of pseudoboehmite, alumina trihydrate, boehmite, and amorphous aluminum hydroxide; the alumina B is at least one selected from the group consisting of γ-alumina, η-alumina, δ-alumina, θ-alumina, κ-alumina and α-alumina; and a weight ratio of the alumina A to the alumina B is in a range of from 1:0.05 to 1:10.0. Preferably, the alumina A is derived from at least one alumina precursor selected from the group consisting of pseudoboehmite, amorphous aluminum hydroxide and boehmite, the alumina B is at least one selected from the group consisting of δ-alumina, θ-alumina and α-alumina, and the weight ratio of the alumina A to the alumina B is in a range of from 1:0.1 to 1:5.0. More preferably, the alumina A is derived from at least one alumina precursor selected from the group consisting of pseudoboehmite and amorphous aluminum hydroxide, the alumina B is at least one selected from the group consisting of δ-alumina, θ-alumina and α-alumina, and the weight ratio of the alumina A to the alumina B is in a range of from 1:0.2 to 1:4.0.

In the second aspect, the present invention provides a process for preparing the alumina support having multiple pore structure, comprising:

(i) mixing the at least one precursor of the alumina A, the at least one alumina B, water, a sol-forming agent and/or a binder, and optionally a modifier in desired proportions, to provide a mixture;

(ii) moulding the mixture from the step (i); and (iii) drying the moulded mixture, and then calcining it.

In the process according to the invention, the drying of the moulded mixture may be performed at a temperature of 50 to 100° C. for 1 to 24 hours. In the process according to the invention, the calcining may be carried out at a temperature of from 800 to 1150° C., preferably from 900 to 1100° C. for 1 to 10 hours, preferably for 2 to 8 hours.

The sol-forming agent useful in the preparation of the alumina support according to the invention means substance that can reacts with an alumina or an alumina precursor to form a sol, such as monocarboxylic acids, for example, formic acid, acetic acid, propanoic acid, butanoic acid, etc.; dicarboxylic acids or polycarboxylic acids, for example, succinic acid, maleic acid, citric acid, etc.; anhydrides and weak base salts of said carboxylic acids; inorganic monoprotic acids, for example, nitric acid, hydrochloric acid, etc.; and salts of strong acids, for example, aluminum nitrate, nickelous nitrate, aluminum trichloride, aluminum sulfate, etc. The binder useful in the preparation of the alumina support according to the invention means substance that can bind various alumina powder together at room temperature or lower temperature, such as inorganic sols, for example, alumina sol, silica sol, etc.; and polymers, such as polyvinyl alcohols, polyacrylic acids, polymethacrylic acids, poly(vinyl acetate-co-ethylene), polystyrene and polybutadiene, having a number average molecular weight of from 500 to 100,000, preferably from 700 to 50,000, more preferably from 800 to 30,000. Preferably, the sol-forming agent and/or the binder are/is at least one selected from the group consisting of nitric acid, acetic acid, citric acid, alumina sol, silica sol, and polyvinyl alcohols (having a number average molecular weight of from 1000 to 4000). The sol-forming agent and/or the binder are/is used in an amount of from 0.2 to 20 wt. %, preferably from 0.5 to 10 wt. %, based on the solid contents of the mixture obtained in the step (i).

In the above process, water may be used in an amount of from 60 to 95% by weight of the solid contents of the mixture obtained in the step (i). The water may be added alone, alternatively, as a solvent or a dispersion medium of another component.

The modifier, which is optionally used in the above process, includes compounds of elements from Groups IA, IIA, IVA, and VA of the Periodic Table, such as salts and oxides of K, Ca, Mg and Ba, silicon compounds, phosphorus compounds, and mixtures thereof. In a preferred embodiments, the modifier is a combination of at least one compound of element(s) from Groups IVA and VA of the Periodic Table with at least one compound of element(s) from Groups IA and IIA of the Periodic Table, such as a combination of at least one member selected from the group consisting of salts and oxides of K, Ca, Mg and Ba with at least one member selected from the group consisting of silicon compounds and phosphorus compounds. The modifier may be used in an amount, in terms of element(s) from the Groups IA, IIA, IVA and VA of the Periodic Table, of from 0.1 to 20.0 wt. %, preferably from 0.2 to 12.0 wt. %, based on the solid contents of the mixture obtained in the step (i).

The moulding in the step (ii) of the above process may be carried out by a conventional process, for example, by compressing into tablets, rolling into pellets, extruding into strips, and the like. In a preferred embodiment, the moulding is accomplished by an extrusion process.

In the third aspect, the present invention provides a catalyst used for selective hydrogenation of a pyrolysis gasoline, comprising:

(a) the alumina support according to the invention; and (b) 0.01 to 1.2 wt. % of metal palladium or palladium oxides, based on the weight of the alumina support.

The catalyst of the invention is suitable for the hydrogenation of middle distillates of pyrolysis gasoline, such as one consisting of $C_6$ to $C_8$ hydrocarbons or one consisting of $C_5$ to $C_8$ hydrocarbons, or full boiling range pyrolysis gasoline consisting of $C_5$ hydrocarbons up to hydrocarbon having an end boiling point of 204° C., can be operated under higher feed space velocity, exhibits good activity at lower temperature, selectivity and stability, and has high capacity tolerating high content gums and high content free water.

The catalyst of the invention comprises preferably 0.05 to 1.0 wt. %, more preferably 0.1 to 0.7 wt. % of metal palladium or palladium oxides, based on the weight of alumina support.

The catalyst of the invention may be prepared through a conventional shell layer catalyst impregnation technique. For example, the catalyst of the invention may be prepared as follows: a support is optionally pre-impregnated at first with a liquid which is miscible with a Pa salt-containing impregnating liquid, and then is impregnated with the Pa salt-containing impregnating liquid, and then the impregnated support is washed, dried, and calcined in air at a temperature of from 300 to 600° C., to give a finished oxidized catalyst product. The finished catalyst product can be used after having been reduced in reactor by hydrogen gas.

The catalyst of the invention is suitable for the selective hydrogenation of alkynes, conjugated dienes, and the like in petrolic hydrocarbons, including the hydrogenation of full boiling range pyrolysis gasoline (consisting of $C_5$ hydrocarbons up to hydrocarbon having an end boiling point of 204°

C.) or middle distillates of pyrolysis gasoline, such as one consisting of $C_6$ to $C_8$ hydrocarbons.

Thus, in the fourth aspect, the present invention provides a process for selectively hydrogenating a pyrolysis gasoline, comprising contacting the pyrolysis gasoline with the selective hydrogenation catalyst according to the invention under hydrogenation conditions.

The process for selectively hydrogenating the pyrolysis gasoline may be carried out in a manner well known by those skilled in the art.

In the case where the feed is a full boiling range pyrolysis gasoline containing high content gums and high content free water, the presence of micropores in the catalyst will result in that the catalyst is deactivated more easily, because the free water and macromolecules such as the gums adsorbed by the micropores are more difficult of being desorbed so that the catalyst is rendered oleophobic or the specific surface area of the catalyst is reduced. On the contrary, macropores will facilitate the reduction of surface tension so that water adsorbed by the catalyst may be in equilibrium with water in the feed and thus "come and go freely", and the water adsorbed by the catalyst may be even desorbed in the case where water content of the feed is lower. Macroporous supports, however, have generally a less specific surface area, and this is not in favor of the dispersion of the active component. Activity of a catalyst is mainly determined by active surface area of the catalyst, which is in turn related with the specific surface area of the support—a larger specific surface area of the support is in favor of the dispersion of the active component, thereby enhancing the activity of the catalyst.

The alumina support having multiple pore structure according to the invention has a relatively large pore volume, a relatively large specific surface area and a relatively large probable pore diameter, and various pores provide a suitable proportion of pore volume, wherein a pore volume of pores having a pore diameter of from 30 to 60 nm comprises 20 to 75% of the total pore volume, a pore volume of micropores having a pore diameter of less than 10 nm comprises 0 to 10% of the total pore volume, and the specific surface area of the support is mainly provided by pores having medium pore diameter in narrow distribution. When used in the selective hydrogenation of a full boiling range pyrolysis gasoline (consisting of $C_5$ hydrocarbons up to hydrocarbon having an end boiling point of 204° C.), the catalyst based on the alumina support having multiple pore structure according to the invention exhibits good activity at lower temperature, selectivity and stability, and has good tolerance to high content gums and high content free water. Under the following conditions: inlet temperature=40° C., reaction pressure=2.7 MPa, volume ratio of hydrogen to oil=80:1, and volume space velocity of fresh oil=3.8 $h^{-1}$, a selective hydrogenation of a full boiling range pyrolysis gasoline (consisting of $C_5$ hydrocarbons up to hydrocarbon having an end boiling point of 204° C.) having a gum content of 150 mg/100 g oil and a free water content of 1000 ppm may give an average diene value at outlet of 0.0 g iodine/100 g oil, that is, a hydrogenation rate of diene of 100%.

EXAMPLES

The following examples are given for further illustrating the invention, but do not make limitation to the invention in any way.

Example 1

380 g of boehmite, 20 g of δ-alumina, 12 g of Sesbania cannabina powder, 20 g of 5 wt. % aqueous solution of polyvinyl alcohol (number average molecular weight=1750), 4.5 g of acetic acid, and 4.5 g of citric acid were mixed together, and then extruded into φ 2.5 mm trilobal extrudes. The wet extrudes were dried at 100° C. for 2 hours, and then calcined at 900° C. for 8 hours, to give a support Z0. The specific surface area, pore volume, probable pore diameter, and pore distribution of the support Z0 were measured by mercury intrusion method. The results are shown in the Table 1 below.

Example 2

300 g of pseudoboehmite, 30 g of δ-alumina, 9 g of Sesbania cannabina powder, 18 g of 5 wt. % aqueous solution of polyvinyl alcohol (number average molecular weight=1750), and 4.0 g of nitric acid were mixed together, and then extruded into φ 2.5 mm trilobal extrudes. The wet extrudes were dried at 100° C. for 2 hours, and then calcined at 900° C. for 8 hours, to give a support Z1. The specific surface area, pore volume, probable pore diameter, and pore distribution of the support Z1 were measured by mercury intrusion method. The results are shown in the Table 1 below.

Example 3

300 g of pseudoboehmite, 150 g of α-alumina, 12 g of Sesbania cannabina powder, 30 g of 5 wt. % aqueous solution of polyvinyl alcohol (number average molecular weight=1750), and 6.0 g of acetic acid were mixed together, and then extruded into φ 2.5 mm trilobal extrudes. The wet extrudes were dried at 50° C. for 24 hours, and then calcined at 1000° C. for 4 hours, to give a support Z2. The specific surface area, pore volume, probable pore diameter, and pore distribution of the support Z2 were measured by mercury intrusion method. The results are shown in the Table 1 below.

Example 4

200 g of pseudoboehmite, 200 g of θ-alumina, 12 g of Sesbania cannabina powder, 25 g of 5 wt. % aqueous solution of polyvinyl alcohol (number average molecular weight=1750), 4.0 g of nitric acid, and 34 g of alumina sol (alumina content=10 wt. %) were mixed together, and then extruded into φ 2.5 mm trilobal extrudes. The wet extrudes were dried at 80° C. for 6 hours, and then calcined at 1100° C. for 2 hours, to give a support Z3. The specific surface area, pore volume, probable pore diameter, and pore distribution of the support Z3 were measured by mercury intrusion method. The results are shown in the Table 1 below.

Example 5

80 g of amorphous aluminum hydroxide, 320 g of θ-alumina, 12 g of Sesbania cannabina powder, 20 g of 5 wt. % aqueous solution of polyvinyl alcohol (number average molecular weight=1750), 6.0 g of nitric acid, and 34 g of alumina sol (alumina content=10 wt. %) were mixed together, and then extruded into φ 2.5 mm trilobal extrudes. The wet extrudes were dried at 80° C. for 6 hours, and then calcined at 1100° C. for 2 hours, to give a support Z4. The specific surface area, pore volume, probable pore diameter, and pore distribution of the support Z4 were measured by mercury intrusion method. The results are shown in the Table 1 below.

Example 6

40 g of pseudoboehmite, 360 g of α-alumina, 12 g of Sesbania cannabina powder, 3.0 g of emulsion of poly(vinyl acetate-co-ethylene) (VAE707, having a solid content of 54.5%, available from the Sichuan Vinylon Factory, China Petroleum and Chemical Corporation), 3.0 g of nitric acid, and 8 g of aluminum nitrate were mixed together, and then extruded into φ 2.5 mm trilobal extrudes. The wet extrudes were dried at 50° C. for 24 hours, and then calcined at 1000° C. for 4 hours, to give a support Z5. The specific surface area, pore volume, probable pore diameter, and pore distribution of the support Z5 were measured by mercury intrusion method. The results are shown in the Table 1 below.

Comparative Example 1

300 g of pseudoboehmite, 9 g of Sesbania cannabina powder, 45 g of graphite, and 4.0 g of nitric acid were mixed together, and then extruded into φ 2.5 mm trilobal extrudes. The wet extrudes were dried at 120° C. for 4 hours, and then calcined at 1050° C. for 4 hours, to give a support D1. The specific surface area, pore volume, probable pore diameter, and pore distribution of the support D1 were measured by mercury intrusion method. The results are shown in the Table 1 below.

TABLE 1

| | | | Example No. | | | | |
|---|---|---|---|---|---|---|---|
| | 1 | 2 | 3 | 4 | 5 | 6 | Comp. Ex. 1 |
| Support | Z0 | Z1 | Z2 | Z3 | Z4 | Z5 | D1 |
| Specific surface area, $m^2/g$ | 140.5 | 139.2 | 108.5 | 65.4 | 53.8 | 46.7 | 102.3 |
| pore volume, $cm^3/g$ | 0.42 | 0.65 | 0.78 | 0.92 | 1.08 | 1.10 | 0.56 |
| Probable pore diameter, nm | 19 | 20 | 25 | 27 | 27 | 28 | 22 |
| Pore distribution % <10 nm | 8.0 | 2.0 | 1.0 | 0.5 | 0.2 | 0.1 | 12.5 |
| <30 nm | 55 | 53 | 35 | 6.5 | 5.8 | 5.3 | 92.6 |
| 30 to 60 nm | 25 | 25 | 37 | 71.6 | 48 | 42.0 | 3.8 |
| >60 nm | 20 | 22 | 28 | 21.9 | 46.2 | 52.7 | 3.6 |

Examples 7 to 12 illustrate the performance of catalysts prepared from the supports of the invention in the first-stage hydrogenation of a full boiling range pyrolysis gasoline containing high content gums and high content free water.

Example 7

60 g of the support Z0 as prepared in Example 1 was impregnated in 300 ml of $PdCl_2$ impregnation solution ($PdCl_2$ mass concentration=0.10%) until the impregnation solution became colorless. After removing the liquid, the solids were dried at 60° C. for 16 hours, and then calcined at 480° C. for 3 hours, to give a Pd-based catalyst, C0. The catalyst had a Pd content of 0.3 wt. %, based on the weight of the alumina support.

Example 8

A Pd-based catalyst C1 was prepared from 60 g of the support Z1 as prepared in Example 2 through the impregnation process as described in Example 7. The catalyst had a Pd content of 0.3 wt. %, based on the weight of the alumina support.

Example 9

A Pd-based catalyst C2 was prepared from 60 g of the support Z2 as prepared in Example 3 through the impregnation process as described in Example 7. The catalyst had a Pd content of 0.3 wt. %, based on the weight of the alumina support.

Example 10

A Pd-based catalyst C3 was prepared from 60 g of the support Z3 as prepared in Example 4 through the impregnation process as described in Example 7. The catalyst had a Pd content of 0.3 wt. %, based on the weight of the alumina support.

Example 11

A Pd-based catalyst C4 was prepared from 60 g of the support Z4 as prepared in Example 5 through the impregnation process as described in Example 7. The catalyst had a Pd content of 0.3 wt. %, based on the weight of the alumina support.

Example 12

A Pd-based catalyst C5 was prepared from 60 g of the support Z5 as prepared in Example 6 through the impregnation process as described in Example 7. The catalyst had a Pd content of 0.3 wt. %, based on the weight of the alumina support.

Comparative Example 2

A Pd-based catalyst CD1 was prepared from 60 g of the support D1 as prepared in Comparative Example 1 through the impregnation process as described in Example 7. The catalyst had a Pd content of 0.3 wt. %, based on the weight of the alumina support.

The above prepared catalysts C0, C1, C2, C3, C4, C5 and CD1 were evaluated on a 100 ml adiabatic fixed bed mini-reactor, respectively, using a full boiling range pyrolysis gasoline (consisting of $C_5$ hydrocarbons up to hydrocarbon having an end boiling point of 204° C.) having a gum content of 150±2 mg/100 g oil and a free water content of 1000±15 ppm as feedstock. The feedstock contained 15±1 wt. % of $C_5$ hydrocarbons, 65±2 wt. % of $C_6$ to $C_8$ hydrocarbons and 20±1 wt. % of $C_9^+$ hydrocarbons, and had a diene value of 27.12±0.30 g iodine/100 g oil. Reaction conditions were as follows: temperature at inlet=40° C., pressure=2.65 MPa, volume space velocity of fresh oil=3.8 $h^{-1}$, recycle ratio=2.63, and volume ratio of hydrogen to oil=80:1. The evaluation results are shown in the Table 2 below.

TABLE 2

| Example | Catalyst | Diene value at outlet (g iodine/100 g oil) | Hydrogenation rate of diene % |
|---|---|---|---|
| 7 | C0 | 0.12 | 99.5 |
| 8 | C1 | 0.25 | 99.0 |
| 9 | C2 | 0.10 | 99.6 |
| 10 | C3 | 0.00 | 100 |
| 11 | C4 | 0.00 | 100 |
| 12 | C5 | 0.00 | 100 |
| Comp. Ex. 2 | CD1 | 3.4 | 86.4 |

It can be seen from the data shown in the Table 2 that the catalysts of the invention are suitable for the first-stage hydrogenation of the full boiling range pyrolysis gasoline containing higher content gums and higher content free water, with their performance being markedly superior to that of the catalyst prepared from conventional macroporous alumina support.

Example 13

300 g of pseudoboehmite, 150 g of α-alumina and 9 g of Sesbania cannabina powder were mixed together, and then to the mixture was added 360 ml of aqueous solution containing 25 g of 5 wt. % aqueous solution of polyvinyl alcohol (number average molecular weight=1750), 4.0 g of nitric acid, 1.8 g of 85% phosphoric acid, 1.5 g of potassium nitrate, and 2 g of magnesium nitrate. The resultant mixture was mixed homogeneously, and then extruded into φ 2.5 mm trilobal extrudes. The wet extrudes were dried at 50° C. for 24 hours, and then calcined at 1000° C. for 4 hours, to give a modified alumina support having multiple pore structure, Z6.

60 g of the support was pre-impregnated with equivalent volume of deionized water, and then dripped water to dry. Next, the support was impregnated in 210 ml of $PdCl_2$ impregnation solution ($PdCl_2$ mass concentration=0.143%) until the impregnation solution became colorless. After removing the liquid, the solids were dried at 120° C. for 4 hours and then calcined at 450° C. for 4 hours to give a Pd-based catalyst C6. The catalyst had a Pd content of 0.3 wt. %, based on the weight of the alumina support. The composition of the catalyst as well as its specific surface area, pore volume, pore distribution are shown in the Table 3 below, wherein the content of each component is based on the weight of the alumina support.

Example 14

75 g of pseudoboehmite, 375 g of δ-alumina, and 9 g of Sesbania cannabina powder were mixed together, and then to the mixture was added 360 ml of aqueous solution containing 25 g of 5 wt. % aqueous solution of polyvinyl alcohol (number average molecular weight=1750), 2.0 g of nitric acid, 240 g of silica sol (mass concentration=40%), and 1.7 g barium nitrate. The resultant mixture was mixed homogeneously, and then extruded into φ 2.5 mm trilobal extrudes. The wet extrudes were dried at 50° C. for 24 hours, and then calcined at 950° C. for 4 hours, to give a modified alumina support having multiple pore structure, Z7.

A Pa-based catalyst C7 was prepared from 60 g of the support Z7 by the procedure as described in Example 13, and the catalyst had a Pd content of 0.5 wt. %, based on the weight of the alumina support. The composition of the catalyst as well as its specific surface area, pore volume, pore distribution are shown in the Table 3 below, wherein the content of each component is based on the weight of the alumina support.

Example 15

150 g of pseudoboehmite, 300 g of α-alumina, and 9 g of Sesbania cannabina powder were mixed together, and then to the mixture was added 360 ml of aqueous solution containing 25 g of 5 wt. % aqueous solution of polyvinyl alcohol (number average molecular weight=1750), 4.0 g of nitric acid, 4.5 g of 85% phosphoric acid, and 13.4 g of calcium nitrate tetrahydrate. The resultant mixture was mixed homogeneously, and then extruded into φ 2.5 mm trilobal extrudes. The wet extrudes were dried at 50° C. for 24 hours, and then calcined at 900° C. for 4 hours, to give a modified alumina support having multiple pore structure, Z8.

A Pa-based catalyst C8 was prepared from 60 g of the support Z8 by the procedure as described in Example 13, and the catalyst had a Pd content of 0.18 wt. %, based on the weight of the alumina support. The composition of the catalyst as well as its specific surface area, pore volume, pore distribution are shown in the Table 3 below, wherein the content of each component is based on the weight of the alumina support.

TABLE 3

| | | Example No. | | | |
|---|---|---|---|---|---|
| | | 13 | 14 | 15 | Comp. Ex. 2 |
| Catalyst No. | | C6 | C7 | C8 | CD1 |
| Support No. | | Z6 | Z7 | Z8 | D1 |
| Pd weight content, % | | 0.3 | 0.5 | 0.18 | 0.3 |
| Weight content of Group IA element, % | | K-0.3 | 0 | 0 | 0 |
| Weight content of Group IIA element, % | | Mg-0.5 | Ba-0.2 | Ca-0.5 | 0 |
| Weight content of Group IVA element, % | | 0 | Si-10 | 0 | 0 |
| Weight content of Group VA element, % | | P-0.2 | 0 | P-0.5 | 0 |
| Specific surface area, $m^2/g$ | | 89.4 | 134.1 | 65.0 | 102.3 |
| Pore volume, $cm^3/g$ | | 0.79 | 0.69 | 0.91 | 0.56 |
| Probable pore diameter, nm | | 22 | 21 | 24 | 22 |
| Pore distribution % | <30 nm | 32 | 44 | 22 | 92.6 |
| | 30 to 60 nm | 30 | 24 | 33 | 3.8 |
| | >60 nm | 38 | 32 | 45 | 3.6 |

Example 16

This Example demonstrates the use of the catalysts as prepared in Examples 7 and 12 to 15 in selective hydrogenation of a full boiling range pyrolysis gasoline (consisting of $C_5$ hydrocarbons up to hydrocarbon having an end boiling point of 204° C.).

100 ml of each catalyst obtained from Examples 7 and 12-15 was separately packed into a 100 ml adiabatic fixed bed mini-reactor, and then reduced for 8 hours under the following conditions: hydrogen pressure=2.7 MPa, temperature=110° C., and hydrogen flow rate=4 ml/(min·g catalyst). Next, evaluation experiments were conducted by introducing a full boiling range pyrolysis gasoline, which had a gum content of 150±2 mg/100 g oil and a free water content of 1000±15 ppm by weight, contained 15±1 wt. % of $C_5$ hydrocarbons, 65±2 wt. % of $C_6$ to $C_8$ hydrocarbons and 20±1 wt. % of $C_9^+$ hydrocarbons, and had a diene value of 27.12±0.30 g iodine/100 g oil, under the following conditions: hydrogen pressure=2.7 MPa, inlet temperature=40° C., fresh oil volume space velocity=3.8 $h^{-1}$, total volume space velocity of oil=13.8 $h^{-1}$ (recycle ratio=2.63), and volume ratio of hydrogen to oil=80:1. The hydrogenation results are shown in the Table 4 below.

TABLE 4

| Example | Catalyst | Reaction time (hours) | Average diene value of product (g iodine/100 g oil) | Average hydrogenation rate of diene % |
|---|---|---|---|---|
| 16 Entry 1 | C0 | 250 | 0.10 | 99.6 |
| Entry 2 | C5 | 250 | 0.05 | 99.8 |
| Entry 3 | C6 | 250 | 0.05 | 99.8 |
| Entry 4 | C7 | 250 | 0.15 | 99.4 |
| Entry 5 | C8 | 250 | 0.00 | 100.0 |
| Comp. Ex. 2 | CD1 | 250 | 2.80 | 88.8 |

Example 17

100 ml of the catalyst C6 obtained from Example 13 was packed into a 100 ml adiabatic fixed bed mini-reactor, and then reduced for 8 hours under the following conditions: hydrogen pressure=2.7 MPa, temperature=110° C., and hydrogen flow rate=4 ml/(min·g catalyst). Next, evaluation experiment was performed for 1000 hours by introducing a full boiling range pyrolysis gasoline, which had a gum content of 150±2 mg/100 g oil and a free water content of 1000±15 ppm by weight, contained 15±1 wt. % of $C_5$ hydrocarbons, 65±2 wt. % of $C_6$ to $C_8$ hydrocarbons and 20±1 wt. % of $C_9^+$ hydrocarbons, and had a diene value of 27.12±0.30 g iodine/100 g oil, under the following conditions: reaction pressure=2.65 MPa, temperature at inlet=40° C., fresh oil volume space velocity=3.8 h$^{-1}$, total volume space velocity of oil=13.8 h$^{-1}$, and volume ratio of hydrogen to oil=80:1. The hydrogenation results are shown in the Table 5 below.

TABLE 5

| Reaction time (hours) | Average diene value of product (g iodine/100 g oil) | Average hydrogenation rate of diene (%) |
|---|---|---|
| 50 | 0.00 | 100.0 |
| 100 | 0.05 | 99.8 |
| 150 | 0.06 | 99.8 |
| 200 | 0.07 | 99.7 |
| 250 | 0.06 | 99.8 |
| 300 | 0.08 | 99.7 |
| 350 | 0.07 | 99.7 |
| 400 | 0.06 | 99.8 |
| 450 | 0.05 | 99.8 |
| 500 | 0.05 | 99.8 |
| 550 | 0.06 | 99.8 |
| 600 | 0.07 | 99.7 |
| 650 | 0.07 | 99.7 |
| 700 | 0.08 | 99.7 |
| 750 | 0.07 | 99.7 |
| 800 | 0.07 | 99.7 |
| 850 | 0.07 | 99.7 |
| 900 | 0.07 | 99.7 |
| 950 | 0.07 | 99.7 |
| 1000 | 0.06 | 99.8 |

Example 18

100 ml of the catalyst C7 obtained from Example 14 was packed into a 100 ml adiabatic fixed bed mini-reactor, and then reduced for 8 hours under the following conditions: hydrogen pressure=2.7 MPa, temperature=110° C., and hydrogen flow rate=4 ml/(min·g catalyst). Next, evaluation experiment was performed by introducing a middle distillate of pyrolysis gasoline consisting of $C_6$ to $C_8$ hydrocarbons, which had a gum content of 140±2 mg/100 g oil and a free water content of 1000±15 ppm by weight, under the following conditions: reaction pressure=2.65 MPa, temperature at inlet=44° C., fresh oil volume space velocity=3.8 h$^{-1}$, total volume space velocity of oil=13.8 h$^{-1}$, and volume ratio of hydrogen to oil=110:1. The feed had a diene value of 23.99±0.30 g iodine/100 g oil. The hydrogenation results are shown in the Table 6 below.

TABLE 6

| Reaction time (hours) | Average diene value of product (g iodine/100 g oil) | Average hydrogenation rate of diene (%) |
|---|---|---|
| 50 | 0.00 | 100.0 |
| 100 | 0.03 | 99.9 |
| 150 | 0.05 | 99.8 |
| 200 | 0.10 | 98.6 |
| 250 | 0.07 | 99.7 |
| 300 | 0.06 | 99.7 |
| 350 | 0.05 | 99.8 |
| 400 | 0.04 | 99.8 |
| 450 | 0.02 | 99.9 |
| 500 | 0.05 | 99.8 |

The patents, patent applications, non-patent literatures and testing methods cited in the specification are incorporated herein by reference.

While the invention has been described with reference to exemplary embodiments, it will be understood by those skilled in the art that various changes and modifications may be made without departing from the spirit and scope of the invention. Therefore, the invention is not limited to the particular embodiments disclosed as the best mode contemplated for carrying out this invention, but the invention will include all embodiments falling within the scope of the appended claims.

What is claimed is:

1. An alumina support having multiple pore structure, wherein the alumina support has a specific surface area of from 40 to 160 m$^2$/g and a total pore volume of from 0.3 to 1.2 cm$^3$/g; a pore volume of pores having a pore diameter of less than 30 nm comprises 5 to 60% of the total pore volume; a pore volume of pores having a pore diameter of from 30 to 60 nm comprises 20 to 75% of the total pore volume; and a pore volume of pores having a pore diameter of larger than 60 nm comprises 20 to 60% of the total pore volume.

2. The alumina support according to claim 1, wherein the alumina support has a specific surface area of from 50 to 150 m$^2$/g and a total pore volume of from 0.4 to 1.0 cm$^3$/g; the pore volume of pores having a pore diameter of less than 30 nm comprises 5 to 55% of the total pore volume; the pore volume of pores having a pore diameter of from 30 to 60 nm comprises 20 to 72% of the total pore volume; and the pore volume of pores having a pore diameter of larger than 60 nm comprises 20 to 45% of the total pore volume.

3. The alumina support according to claim 1, wherein a pore volume of pores having a pore diameter of less than 10 nm comprises 0 to 10% of the total pore volume of the alumina support.

4. The alumina support according to claim 1, which is a composition comprising alumina A and alumina B, wherein the alumina A is derived from at least one alumina precursor selected from the group consisting of pseudoboehmite, alumina trihydrate, boehmite, and amorphous aluminum hydroxide; the alumina B is at least one selected from the group consisting of γ-alumina, η-alumina, δ-alumina, θ-alumina, κ-alumina and α-alumina; and a weight ratio of the alumina A to the alumina B is in a range of from 1:0.05 to 1:10.0.

5. The alumina support according to claim 4, wherein the alumina A is derived from at least one alumina precursor selected from the group consisting of alumina trihydrate and pseudoboehmite, the alumina B is at least one selected from the group consisting of δ-alumina, θ-alumina and α-alumina, and the weight ratio of the alumina A to the alumina B is in a range of from 1:0.1 to 1:5.0.

6. The alumina support according to claim 1, further comprising:
  (a) 0.1 to 1.5 wt. % of at least one metal selected from the group consisting of alkali metals and alkaline earth metals and presented in a form of salt(s) and/or oxide(s) thereof; and/or
  (b) 0.1 to 20.0 wt. % of at least one element selected from the group consisting of elements of Group IVA and Group VA of the Periodic Table and presented in a form of compound(s) thereof,
  with all the percentages being based on the weight of the alumina support.

7. The alumina support according to claim 6, which comprises:
  (a) 0.2 to 0.8 wt. % of the at least one metal selected from the group consisting of alkali metals and alkaline earth metals and presented in a form of salt(s) and/or oxide(s) thereof; and/or
  (b) 0.2 to 10.0 wt. % of at least one element selected from the group consisting of elements of Group IVA and Group VA of the Periodic Table and presented in a form of compound(s) thereof,
  with all the percentages being based on the weight of the alumina support.

8. The alumina support according to claim 6, wherein the component (a) is at least one selected from the group consisting of K, Ca, Mg and Ba, presented in a form of salt(s) and/or oxide(s) thereof; and the component (b) is at least one member selected from the group consisting of Si and P, presented in a form of compound(s).

9. A process for preparing the alumina support according to claim 1, comprising the steps of:
  (i) mixing a precursor of alumina A, alumina B, water, a sol-forming agent and/or a binder, and optionally a modifier, to provide a mixture, comprised of solid contents, wherein the precursor of alumina A is at least one selected from the group consisting of alumina trihydrate, boehmite, pseudoboehmite and amorphous aluminum hydroxide; the alumina B is at least one selected from the group consisting of $\gamma$-alumina, $\eta$-alumina, $\delta$-alumina, $\theta$-alumina, $\kappa$-alumina and $\alpha$-alumina; and the modifier is at least one compound of at least one element selected from the group consisting of Groups IA, IIA, IVA and VA of the Periodic Table;
  (ii) moulding the mixture from step (i); and
  (iii) drying the moulded mixture and then calcining said dried moulded mixture.

10. The process according to claim 9, wherein a weight ratio of the alumina A to the alumina B is in a range of from 1:0.05 to 1:10.0.

11. The process according to claim 9, wherein the precursor of alumina A is at least one selected from the group consisting of alumina trihydrate and pseudoboehmite, the alumina B is at least one selected from the group consisting of $\delta$-alumina, $\theta$-alumina and $\alpha$-alumina, and a weight ratio of the alumina A to the alumina B is in a range of from 1:0.1 to 1:5.0.

12. The process according to claim 9, wherein the sol-forming agent is selected from the group consisting of monocarboxylic acids, dicarboxylic acids, polycarboxylic acids, carboxylic anhydrides, weak base salts of carboxylic acids, inorganic monoprotic acids, a substance which reacts with an alumina or an alumina precursor to form a sol, and mixtures thereof; the binder is selected from the group consisting of inorganic sols, polymers having a number average molecular weight of from 500 to 100,000, and combinations thereof; and the combined amount of the sol-forming agent and the binder is in a range of from 0.2 to 20 wt. %, based on the solid contents obtained in the step (i).

13. The process according to claim 12, wherein the sol-forming agent is selected from the group consisting of formic acid, acetic acid, propanoic acid, butanoic acid, succinic acid, maleic acid, citric acid, anhydrides of said carboxylic acids, weak base salts of carboxylic acids selected from the group consisting of formic acid, acetic acid, propanoic acid, butanoic acid, succinic acid, maleic acid, and citric acid, nitric acid, hydrochloric acid, aluminum nitrate, nickelous nitrate, aluminum trichloride, aluminum sulfate, and mixtures thereof; the binder is selected from the group consisting of alumina sol, silica sol, polyvinyl alcohols, polyacrylic acids, polymethacrylic acids, poly(vinyl acetate-co-ethylene), polystyrene, polybutadiene, and mixtures thereof; and the combined amount of the sol-forming agent and the binder is in a range of from 0.5 to 10 wt. %, based on the solid contents obtained in the step (i).

14. The process according to claim 12, wherein the sol-forming agent is at least one selected from the group consisting of nitric acid, acetic acid and citric acid, the binder is at least one selected from the group consisting of alumina sol, silica sol, polyvinyl alcohols having a number average molecular weight of from 1000 to 4000, and the combined amount of the sol-forming agent and the binder is in a range of from 0.5 to 10 wt. %, based on the solid contents obtained in the step (i).

15. The process according to claim 9, wherein the modifier is present in an amount, in terms of the at least one element selected from the group consisting of Groups IA, IIA, IVA and VA of the Periodic Table, from 0.1 to 20.0 wt. %, based on the solid contents of the mixture obtained in the step (i).

16. The process according to claim 9, wherein the modifier is a combination of at least one selected from the group consisting of salts and oxides of K, Ca, Mg and Ba with at least one selected from the group consisting of silicon compounds and phosphorus compounds.

17. The process according to claim 9, wherein the calcining in the step (iii) is performed at a temperature of from 800 to 1150° C. for 1 to 10 hours.

18. A catalyst for selective hydrogenation of a pyrolysis gasoline, comprising:
  (a) the alumina support according to claim 1; and
  (b) 0.01 to 1.2 wt. % of metal palladium or palladium oxides, based on the weight of the alumina support.

19. The catalyst according to claim 18, wherein a content of the metal palladium or palladium oxides is in a range of from 0.1 to 0.7 wt. %, based on the weight of alumina support.

20. A process for selectively hydrogenating a pyrolysis gasoline, comprising contacting the pyrolysis gasoline with the catalyst according to claim 18 under hydrogenation conditions.

21. The alumina support according to claim 8, wherein the member selected from the group consisting of Si and P is present in the form of an oxide.

* * * * *